United States Patent
Huang (10) Patent No.: US 9,304,546 B2
(45) Date of Patent: Apr. 5, 2016

(54) DOCKING STATION AND ELECTRONIC APPARATUS

(71) Applicant: WISTRON CORP., New Taipei (TW)

(72) Inventor: Hung-Ming Huang, New Taipei (TW)

(73) Assignee: WISTRON CORP., New Taipei (TW)

( * ) Notice: Subject to any disclaimer, the term of this patent is extended or adjusted under 35 U.S.C. 154(b) by 40 days.

(21) Appl. No.: 14/284,409

(22) Filed: May 22, 2014

(65) Prior Publication Data

US 2015/0116925 A1    Apr. 30, 2015

(30) Foreign Application Priority Data

Oct. 29, 2013 (TW) .............................. 102139108 A (51) Int. Cl.
*G06F 1/16*    (2006.01)

(52) U.S. Cl.
CPC ............ *G06F 1/1632* (2013.01); *G06F 1/1654* (2013.01)

(58) Field of Classification Search
None
See application file for complete search history.

(56) References Cited

U.S. PATENT DOCUMENTS

| 4,842,525 A * | 6/1989 | Galloway ............ B60R 16/0238 303/119.3 |
| 4,952,160 A * | 8/1990 | Olsen ..................... B63B 17/00 174/67 |
| 5,092,774 A * | 3/1992 | Milan .................... G01R 1/045 324/750.25 |
| 5,391,091 A * | 2/1995 | Nations .............. H01R 12/7047 439/359 |
| 5,397,244 A * | 3/1995 | Generoli ................. B64G 1/641 439/248 |
| 5,402,316 A * | 3/1995 | Volz ....................... H01R 12/87 361/785 |
| 5,823,644 A * | 10/1998 | Suh ......................... G06F 1/181 292/124 |
| 6,260,892 B1 * | 7/2001 | Chang .................. E05C 19/166 292/251.5 |

(Continued)

FOREIGN PATENT DOCUMENTS

| TW | M357665 U1 | 5/2009 |
| TW | M379304 U1 | 4/2010 |

(Continued)

OTHER PUBLICATIONS

Corresponding Taiwanese Office Action that these art references were cited on May 12, 2015.

*Primary Examiner* — Hoa C Nguyen
*Assistant Examiner* — Xanthia C Cunningham
(74) *Attorney, Agent, or Firm* — CKC & Partners Co., Ltd.

(57) ABSTRACT

The disclosure discloses a docking station that includes a housing, a circuit board, a base end electrical connector, a screw, and a resilient member. The housing has a stud. The circuit board is supported on the stud and has a through hole. The through hole is aligned with and communicated with the stud. The base end electrical connector is disposed on the circuit board. The base end electrical connector and the stud are respectively located at two opposite sides of the circuit board. The screw is fastened to the stud via the through hole. The resilient member is sleeved onto the screw and located between the screw and the stud. The disclosure further discloses an electronic apparatus including the docking station.

18 Claims, 8 Drawing Sheets

(56) References Cited

U.S. PATENT DOCUMENTS

| | | | | |
|---|---|---|---|---|
| 6,346,007 B2* | 2/2002 | Yokoi | ............... | H01R 13/74 439/248 |
| 6,471,310 B2* | 10/2002 | Montagna | ............... | G06F 1/184 292/206 |
| 6,527,572 B2* | 3/2003 | Jou | ............... | H01R 13/6315 439/247 |
| 6,592,387 B2* | 7/2003 | Komenda | ............... | H01R 13/6315 439/247 |
| 7,074,065 B1* | 7/2006 | Martinez | ............... | H01R 13/6315 439/247 |
| 7,123,476 B2* | 10/2006 | Ke | ............... | G06F 1/1632 248/346.01 |
| 7,311,541 B2* | 12/2007 | Chien | ............... | H01R 13/748 439/246 |
| 7,345,871 B2* | 3/2008 | Lev | ............... | G06F 1/162 16/327 |
| 7,419,394 B2* | 9/2008 | Jensen | ............... | H01R 13/6315 439/248 |
| 7,420,799 B2* | 9/2008 | Wang | ............... | G06F 1/1616 292/102 |
| 7,485,003 B2* | 2/2009 | Mandrusov | ............... | H01R 13/6315 439/247 |
| 7,549,885 B1* | 6/2009 | Oh | ............... | H01R 13/6215 439/247 |
| 7,556,521 B2* | 7/2009 | Abram | ............... | G06F 1/1632 361/679.41 |
| 7,749,015 B2 | 7/2010 | Uchikawa et al. | | |
| 7,762,817 B2* | 7/2010 | Ligtenberg | ............... | H01R 13/74 439/38 |
| 8,062,054 B2* | 11/2011 | Su | ............... | H01R 13/502 439/362 |
| 8,231,399 B2* | 7/2012 | Daubigney | ............... | H01R 13/6275 439/247 |
| 8,366,469 B2* | 2/2013 | Carnevali | ............... | G06F 1/1632 439/248 |
| 8,545,247 B2* | 10/2013 | Aldana | ............... | G06F 1/1632 439/248 |
| 8,644,018 B2 | 2/2014 | Hung | | |
| 8,647,142 B1* | 2/2014 | Kershaw | ............... | H01R 13/639 439/368 |
| 8,740,633 B2* | 6/2014 | Liao | ............... | G07D 11/0003 439/137 |
| 9,025,321 B2* | 5/2015 | Liang | ............... | G06F 1/1669 361/679.01 |
| 2002/0048982 A1* | 4/2002 | Gu | ............... | H01R 13/6315 439/247 |
| 2003/0008554 A1* | 1/2003 | Chang | ............... | H01R 13/516 439/544 |
| 2005/0026499 A1* | 2/2005 | Choi | ............... | H01R 13/2442 439/607.01 |
| 2006/0035500 A1* | 2/2006 | Sugita | ............... | H01R 13/6315 439/247 |
| 2006/0063434 A1* | 3/2006 | Bergmann | ............... | H01R 25/006 439/638 |
| 2006/0105603 A1* | 5/2006 | Nishio | ............... | H01R 13/6315 439/247 |
| 2006/0141836 A1* | 6/2006 | Van Der Mee | ............... | H01R 13/6315 439/247 |
| 2008/0057764 A1* | 3/2008 | Kuo | ............... | H01R 13/6315 439/248 |
| 2010/0182497 A1 | 7/2010 | Tsai et al. | | |
| 2011/0069445 A1 | 3/2011 | Haren et al. | | |
| 2011/0117833 A1* | 5/2011 | Hong | ............... | H01R 13/60 455/3.06 |
| 2011/0201221 A1 | 8/2011 | Kobayashi | | |
| 2012/0045931 A1* | 2/2012 | Carnevali | ............... | G06F 1/1632 439/544 |

FOREIGN PATENT DOCUMENTS

| | | |
|---|---|---|
| TW | I324841 | 5/2010 |
| TW | 201025740 A1 | 7/2010 |
| TW | 201235818 A1 | 9/2012 |

* cited by examiner

DOCKING STATION AND ELECTRONIC APPARATUS

RELATED APPLICATIONS

This application claims priority to Taiwanese Application Serial Number 102139108, filed Oct. 29, 2013, which is herein incorporated by reference.

BACKGROUND

1. Technical Field

The present disclosure relates to an electronic apparatus, and more particularly, to the electronic apparatus including a tablet module and a docking station.

2. Description of Related Art

Computers are the most widely used tool in life and work for most people in modern society. A typical desktop computer includes a screen, a host, a keyboard, a mouse, a printer, and related peripherals. However, due to the numerous components, installation difficulties, and other reasons limiting mobility, such desktop computers are not portable. Therefore, notebook computers, which are portable and convenient to use, have advantages over desktop computers, and the thinner and lighter tablet computers further extend the ranges of activities of the users of the notebook computers.

But, a tablet computer cannot substitute for a desktop computer to become main office and entertainment equipment like a notebook computer does. The reason is that the input method of the tablet computer is different from those of the desktop computer and the notebook computer. Because the tablet computer has no physical keyboard, it is much more difficult to input contents for a long time. Then, the industry launched a "transformer tablet", which has the advantages of the tablet computer and the notebook computer. The transformer tablet is equipped with a tablet module with a detachable mobile base. The mobile base not only can be used to input contents, but also can extend the using time of the tablet module. When the mobile base is not in use, the tablet module can be carried by removing the mobile base.

However, owing to manufacturing or assembly tolerances, a tablet end electrical connector on the tablet module usually cannot be precisely and smoothly connected to a base end electrical connector on the mobile base, and unnecessary stresses may be generated during connecting. After assembling/disassembling for several times, the tablet end electrical connector and the base end electrical connector must be damaged, and poor contact problem must be occurred.

Accordingly, how to provide an electronic apparatus to solve the aforementioned problems becomes an important issue to be solved by those in the industry.

SUMMARY

The disclosure provides a docking station. The docking station includes a housing, a circuit board, a base end electrical connector, a screw, and a resilient member. The housing has a stud. The circuit board is supported on the stud and has a through hole. The through hole is aligned with and communicated with the stud. The base end electrical connector is disposed on the circuit board. The base end electrical connector and the stud are respectively located at two opposite sides of the circuit board. The screw is fastened to the stud via the through hole. The resilient member is sleeved onto the screw and located between the screw and the stud.

In an embodiment of the disclosure the circuit board has a first surface and a second surface opposite to each other. The through hole runs through the first surface and the second surface. The screw includes a head portion, a passing portion, and a fastening portion. The passing portion is connected between the head portion and the fastening portion. The head portion is located on the first surface. The passing portion passes through the through hole. The resilient member is sleeved onto the passing portion. The fastening portion protrudes out from the second surface and is fastened to the stud.

In an embodiment of the disclosure, the resilient member is a compression spring. The compression spring is compressed between the head portion and the first surface.

In an embodiment of the disclosure, the resilient member compression spring. The compression spring is compressed between the second surface and the stud.

In an embodiment of the disclosure, the screw further has an engaging trough located between the passing portion and the fastening portion. The docking station further includes a stopper engaged with the engaging trough. The resilient member and the circuit board are retained between the head portion and the stopper.

In an embodiment of the disclosure, the stopper is an E-type buckle.

In an embodiment of the disclosure, the resilient member is a sleeve. The sleeve passes through the through hole and is clamped between the head portion and the stud.

In an embodiment of the disclosure, the sleeve includes a main body, a first extending portion, and a second extending portion. The main body passes through the through hole and is clamped between the head portion and the stud. The first extending portion and the second extending portion are respectively connected to two ends of the lain body. The first extending portion is clamped between the head portion and the first surface. The second extending portion is clamped between the second surface and the stud. The circuit board is engaged between the first extending portion and the second extending portion.

In an embodiment of the disclosure, the screw further has an engaging trough located between the passing portion and the fastening portion. The docking station further includes a stopper engaged with the engaging trough. The sleeve and the circuit board are retained between the head portion and the stopper.

The disclosure further provides an electronic apparatus. The electronic apparatus includes a tablet module and a docking station. The tablet module has a guiding hole and includes a tablet end electrical connector. The guiding hole and the tablet end electrical connector are located at the same side of the tablet module. The docking station includes a housing, a circuit board, a base end electrical connector, a screw, and a resilient member. The housing has a stud and a guiding column. The guiding column is configured to insert into the guiding hole. The circuit board is supported on the stud and has a through hole. The through hole is aligned with and communicated with the stud. The base end electrical connector is disposed on the circuit board. The base end electrical connector and the stud are respectively located at two opposite sides of the circuit board. When the guiding column entirely inserts into the guiding hole, the base end electrical connector is electrically connected to the tablet end electrical connector. The screw is fastened to the stud via the through hole. The resilient member is sleeved onto the screw and located between the screw and the stud.

Accordingly, the docking station of the disclosure sleeves the resilient member onto the screw for fastening the circuit board to the housing, so as to change the connection having no freedom of movement between the circuit board and the housing into a connection having freedom of movement.

Therefore, during the connection of the tablet end electrical connector of the tablet module and the base end electrical connector of the docking station, even if the tablet end electrical connector is not precisely aligned, the base end electrical connector having freedom of movement can move with the guidance of guiding structures of the connectors and complete the connection. The docking station of the disclosure not only solves the problems caused by the conventional hard connection, but also diminishes the unnecessary stresses generated between the tablet end electrical connector and the base end electrical connector.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
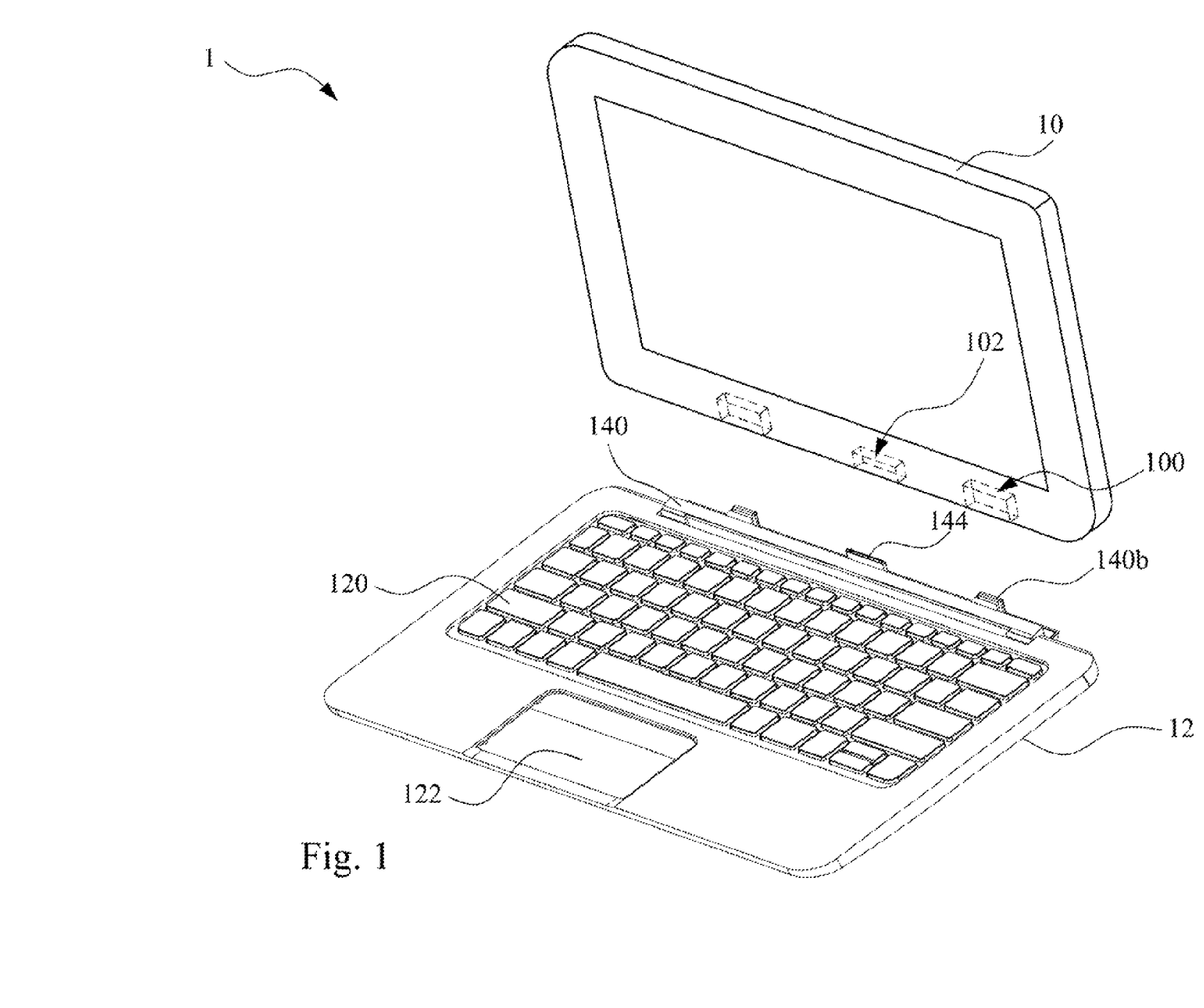
FIG. 1 is an exploded view of an electronic apparatus according to an embodiment of the disclosure.
Figure 2:
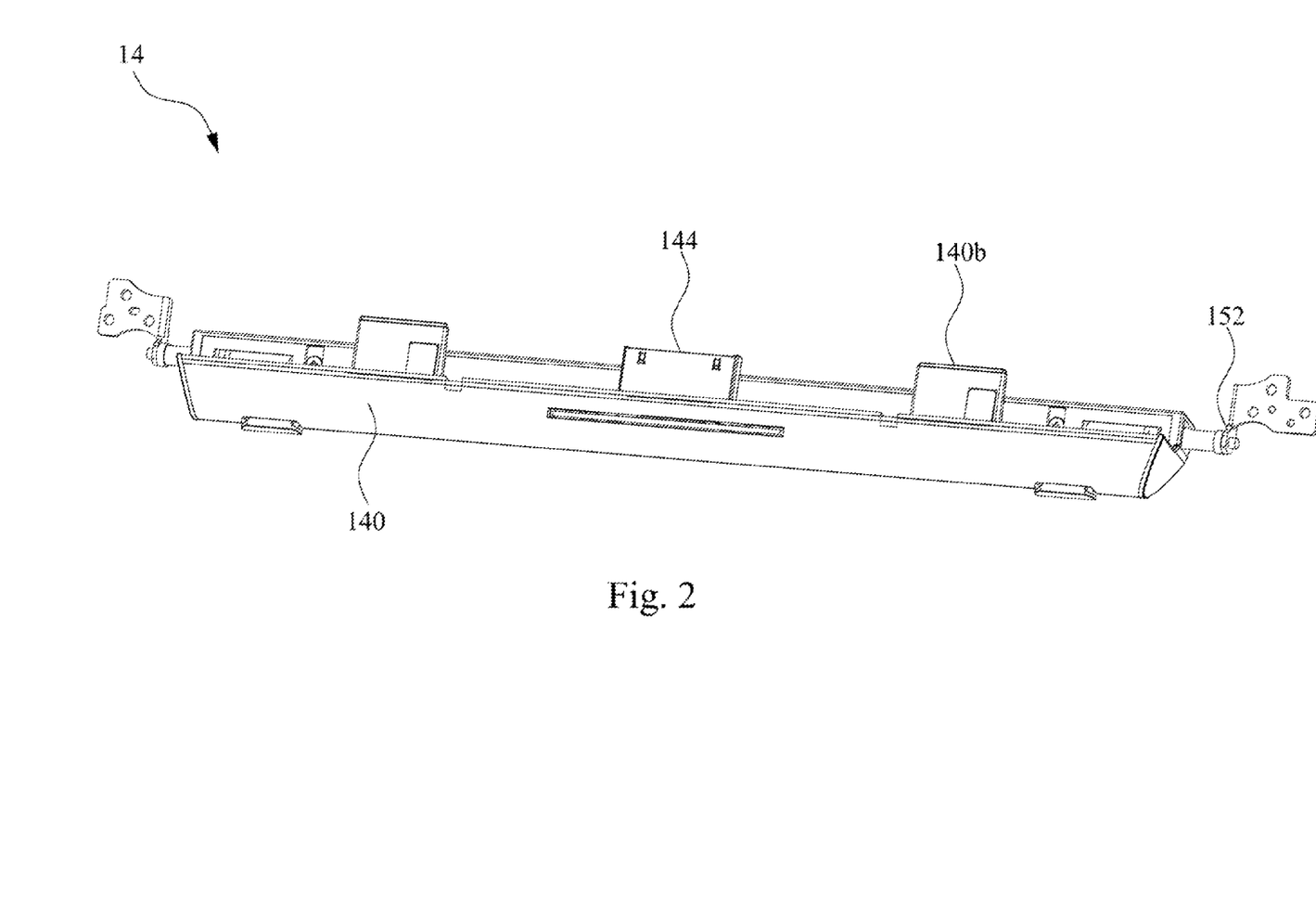
FIG. 2 is a perspective view of a docking station in FIG. 1.

FIG. 1 is an exploded view of an electronic apparatus 1 according to an embodiment of the disclosure. FIG. 2 is a perspective view of a docking station 14 in FIG. 1.

As shown in FIG. 1 and FIG. 2, the electronic apparatus 1 includes a tablet module 10, a mobile base 12, and the docking station 14. The tablet module 10 has two guiding holes 100 (indicated by dotted lines) and includes a tablet end electrical connector 102 (indicated by dotted lines). The guiding holes 100 and the tablet end electrical connector 102 are located at the same side of the tablet module 10 (i.e., the bottom of the tablet module 10 in FIG. 1). The mobile base 12 includes a keyboard 120 and a touch pad 122. The docking station 14 includes a hinge 152, so as to be pivotally connected to an edge of the mobile base 12. The docking station 14 further includes a housing 140 and a base end electrical connector 144. The docking station 14 exposes the base end electrical connector 144 out of the housing 140. The housing 140 of the docking station 14 has two guiding columns 140b. The guiding columns 140b are configured to insert into the guiding holes 100 of the tablet module 10 respectively. When the guiding columns 140b of the housing 140 entirely insert into the guiding holes 100 of the tablet module 10, the base end electrical connector 144 of the docking station 14 is electrically connected to the tablet end electrical connector 102 of the tablet module 10. In other words, the guiding columns 140b can guide the tablet end electrical connector 102 and the base end electrical connector 144 to be electrically connected to each other. The structures and functions of components included in the docking station 14 and relationships among the components are described in detail below.

Figure 3:
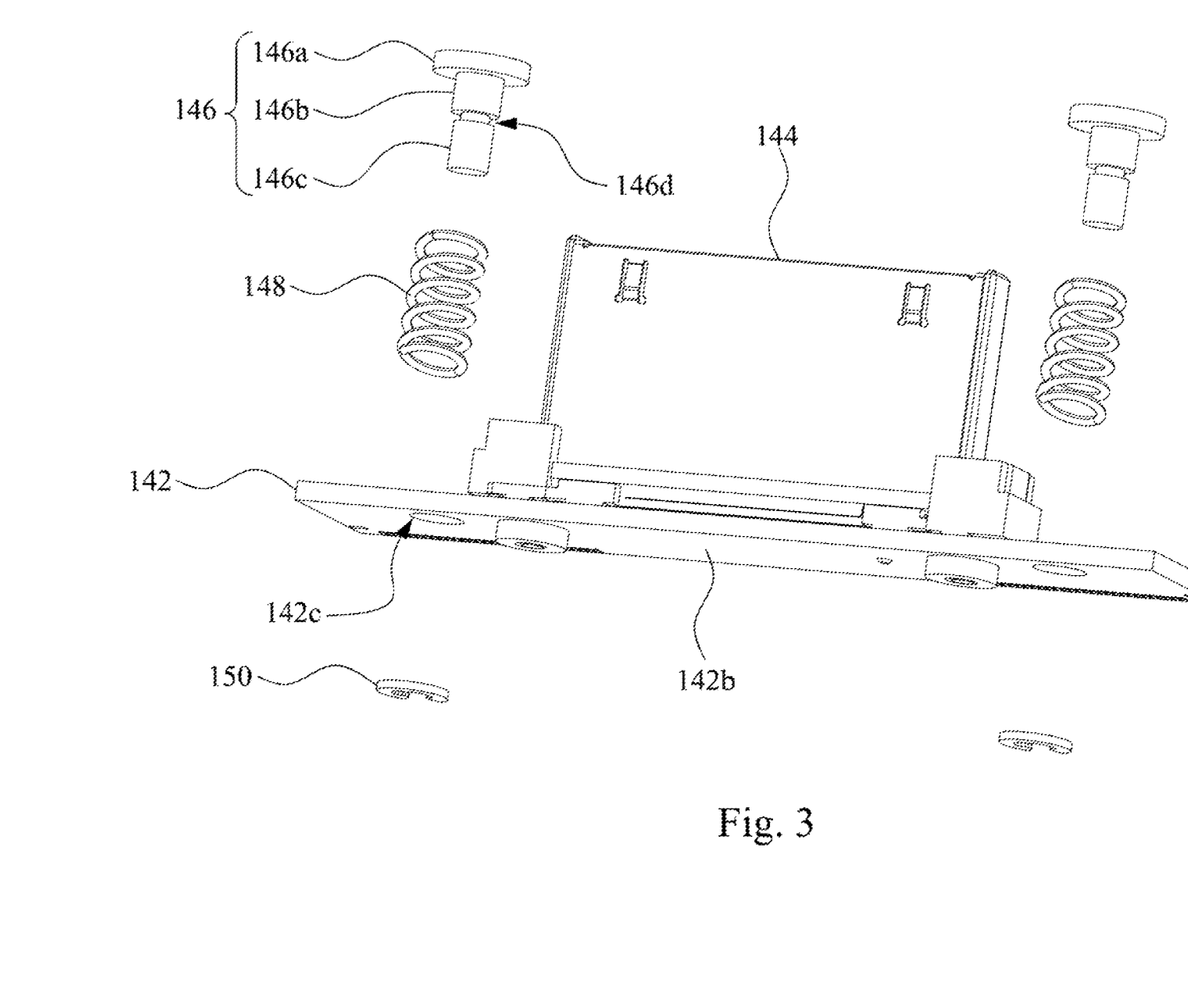
FIG. 3 is a partial exploded view of the docking station in FIG. 2.
Figure 4:
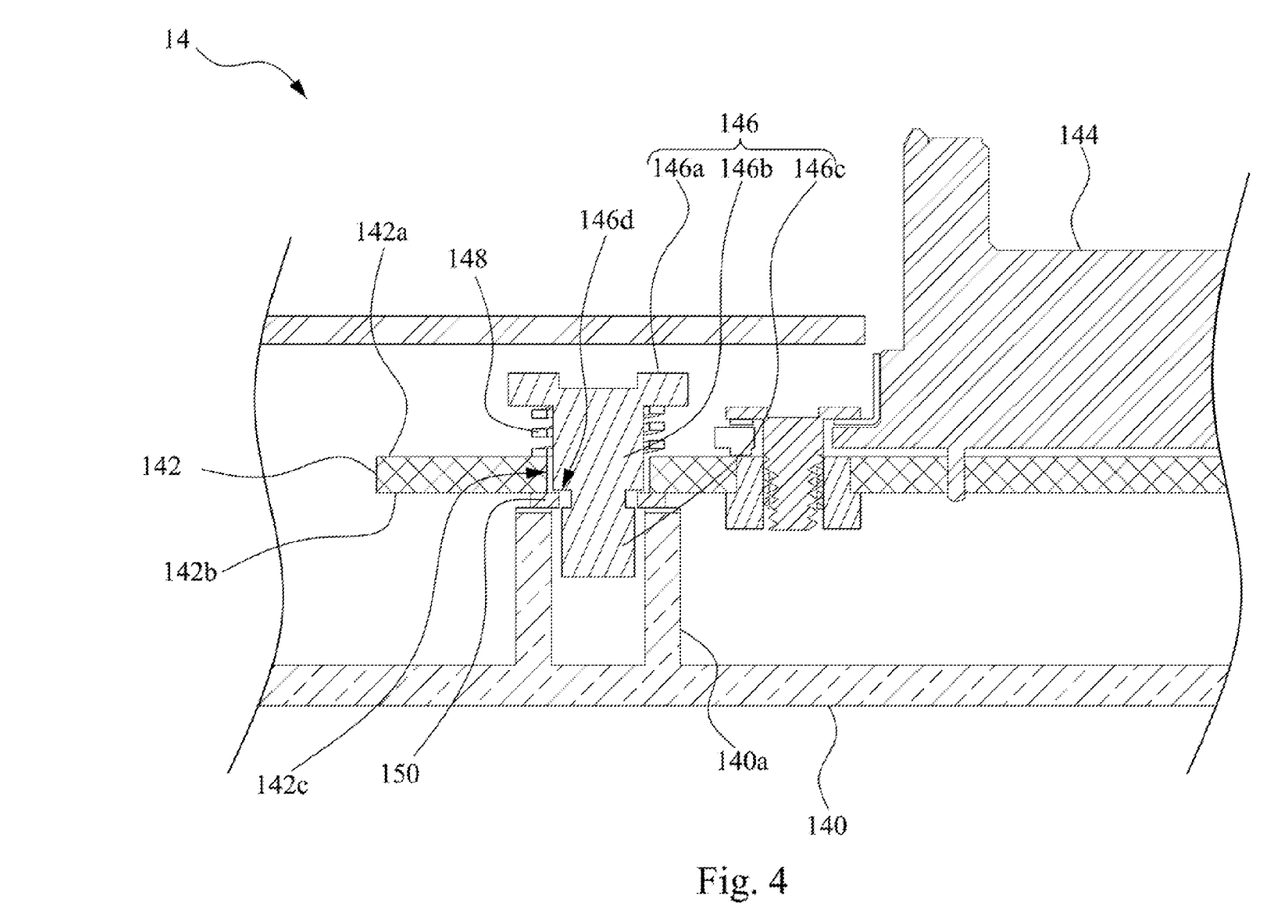
FIG. 4 is a partial cross-sectional view of the docking station in FIG. 2.

FIG. 3 is a partial exploded view of the docking station 14 in FIG. 2. FIG. 4 is a partial cross-sectional view of the docking station 14 in FIG. 2.

As shown in FIG. 3 and FIG. 4, the docking station 14 further includes a circuit board 142, a screw 146, and a resilient member. The housing 140 of the docking station 14 further has a stud 140a. The circuit board 142 is supported on the stud 140a, and has a first surface 142a, a second surface 142b opposite to the first surface 142a, and a through hole 142c running through the first surface 142a and the second surface 142b. The through hole 142c of the circuit board 142 is aligned with and communicated with the stud 140a of the housing 140. The base end electrical connector 144 of the docking station 14 is disposed on the circuit board 142. The base end electrical connector 144 and the stud 140a of the housing 140 are respectively located at two opposite sides of the circuit board 142 (i.e., the upper side and the lower side of the circuit board 142 in FIG. 4). The screw 146 of the docking station 14 is fastened to the stud 140a of the housing 140 via the through hole 142c of the circuit board 142. The resilient member of the docking station 14 is sleeved onto the screw 146, and is located between the screw 146 and the stud 140a. In the embodiment of the disclosure, the resilient member is a compression spring 148, but the disclosure is not limited in this regard.

Furthermore, the screw 146 of the docking station 14 includes a head portion 146a, a passing portion 146b, and a fastening portion 146c. The passing portion 146b of the screw 146 is connected between the head portion 146a and the fastening portion 146c. The head portion 146a of the screw 146 is located on the first surface 142a of the circuit board 142. The passing portion 146b of the screw 146 passes through the through hole 142c of the circuit board 142. The compression spring 148 of the docking station 14 is sleeved onto the passing portion 146b. The fastening portion 146c of the screw 146 protrudes out from the second surface 142b of the circuit board 142 and is fastened to the stud 140a of the housing 140.

In addition, the screw 146 of the docking station 14 further has an engaging trough 146d. The engaging trough 146d is located between the passing portion 146b and the fastening portion 146c. The docking station 14 further includes a stopper 150. The stopper 150 is engaged with the engaging trough 146d of the screw 146. The compression spring 148 and the circuit board 142 are retained between the head portion 146a of the screw 146 and the stopper 150. Under the structural configuration, the compression spring 148 will press the circuit board 142 and makes the second surface 142b of the circuit board 142 abut against the stopper 150. Hence, when the circuit board 142 is fastened to the stud 140a of the housing 140, the stopper 150 can be used to fix the screw 146 and the compression spring 148 to the circuit board 142 first, so as to achieve the effect of conveniently assembling.

In the embodiment of the disclosure, the stopper 150 of the docking station 14 is an E-type buckle, but the disclosure is not limited in this regard. In practice, the stopper 150 of the docking station 14 can be a buckle of other types.

In the embodiment of the disclosure, the compression spring 148 of the docking station 14 is compressed between the head portion 146a of the screw 146 and the first surface 142a of the circuit board 142 (as shown in FIG. 4). However, the disclosure is not limited in this regard.

Figure 5:
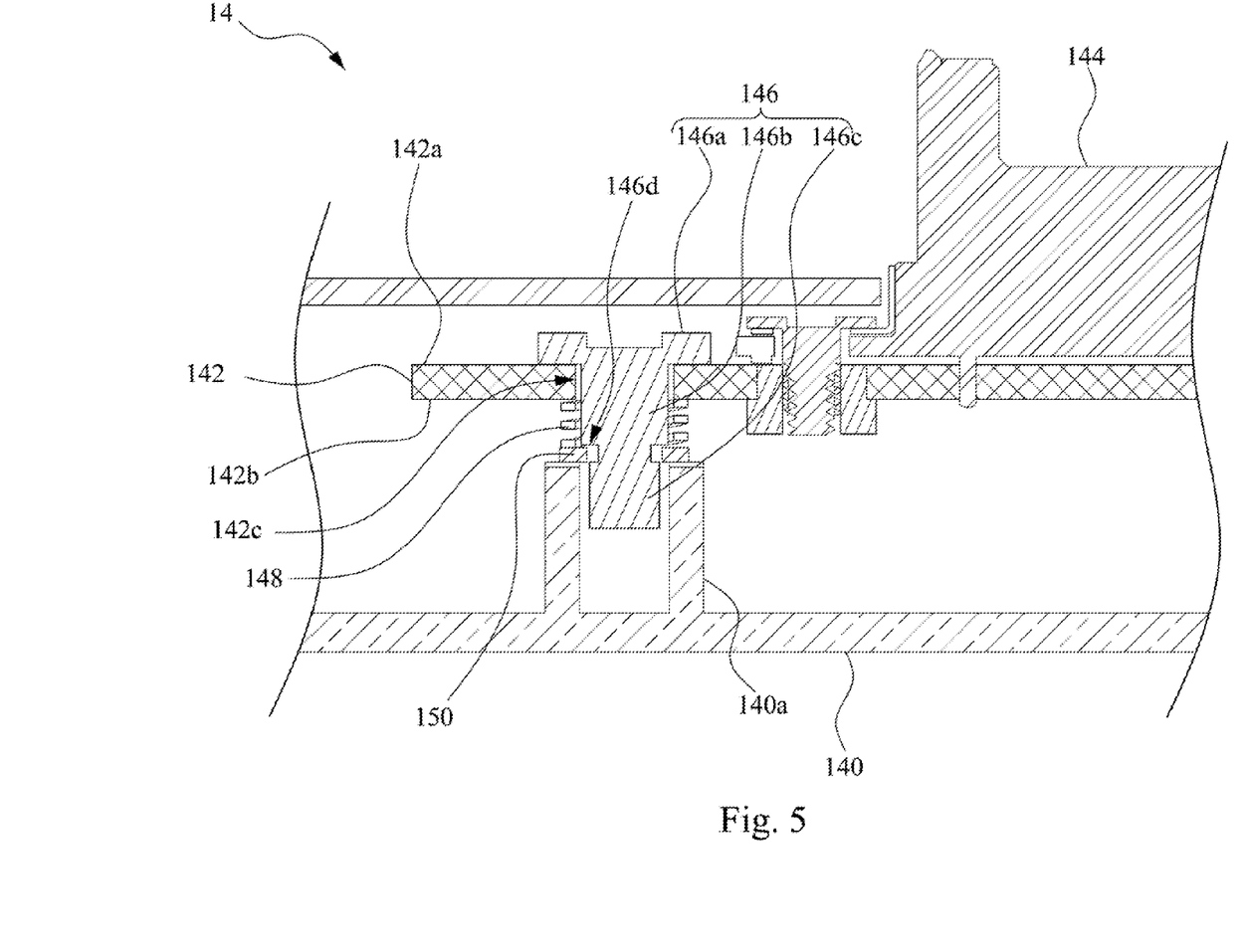
FIG. 5 is a partial cross-sectional view of a docking station according to another embodiment of the disclosure.

FIG. 5 is a partial cross-sectional view of a docking station 14 according to another embodiment of the disclosure.

As shown in FIG. 5, the compression spring 148 of the docking station 14 is compressed between the second surface 142b of the circuit board 142 and the stud 140a of the housing 140 (across the stopper 150).

According to the embodiments shown in FIG. 4 and FIG. 5, it can be seen that the connection between the circuit board 142 and the housing 140 of the docking station 14 has freedom of movement, so during the connection of the tablet end electrical connector 102 and the base end electrical connector 144, even if the tablet end electrical connector 102 is not precisely aligned, the base end electrical connector 144 having freedom of movement can move (to bring the circuit board 142 to unevenly press the compression spring 148) and be aligned with the guidance of guiding structures of the connectors and complete the connection. Therefore, the docking station 14 of the embodiment can diminish the unnecessary stresses generated between the tablet end electrical connector 102 and the base end electrical connector 144 by using the compression spring 148 during connection.

Figure 6:
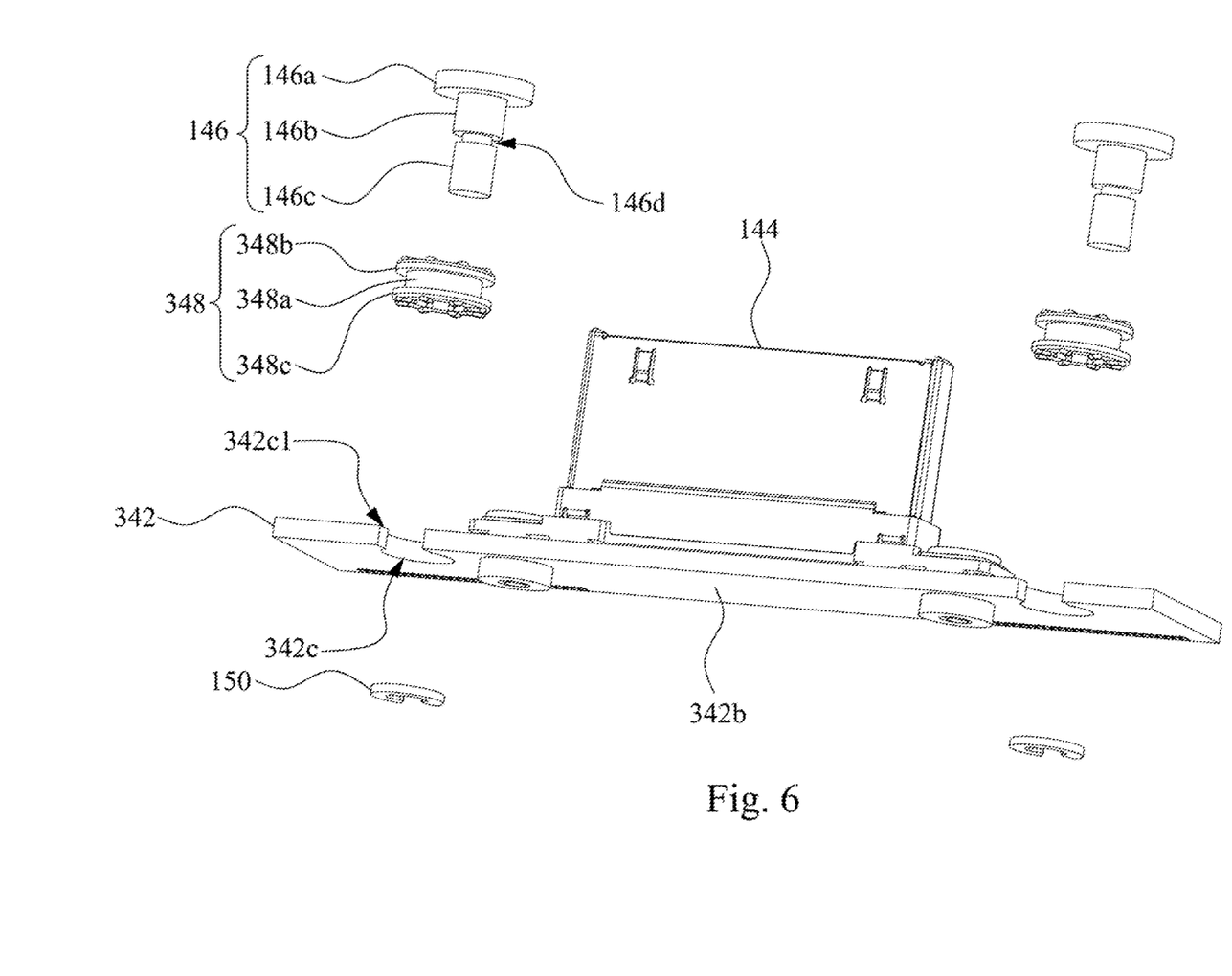
FIG. 6 is a partial exploded view of a docking station according to another embodiment of the disclosure.
Figure 7:
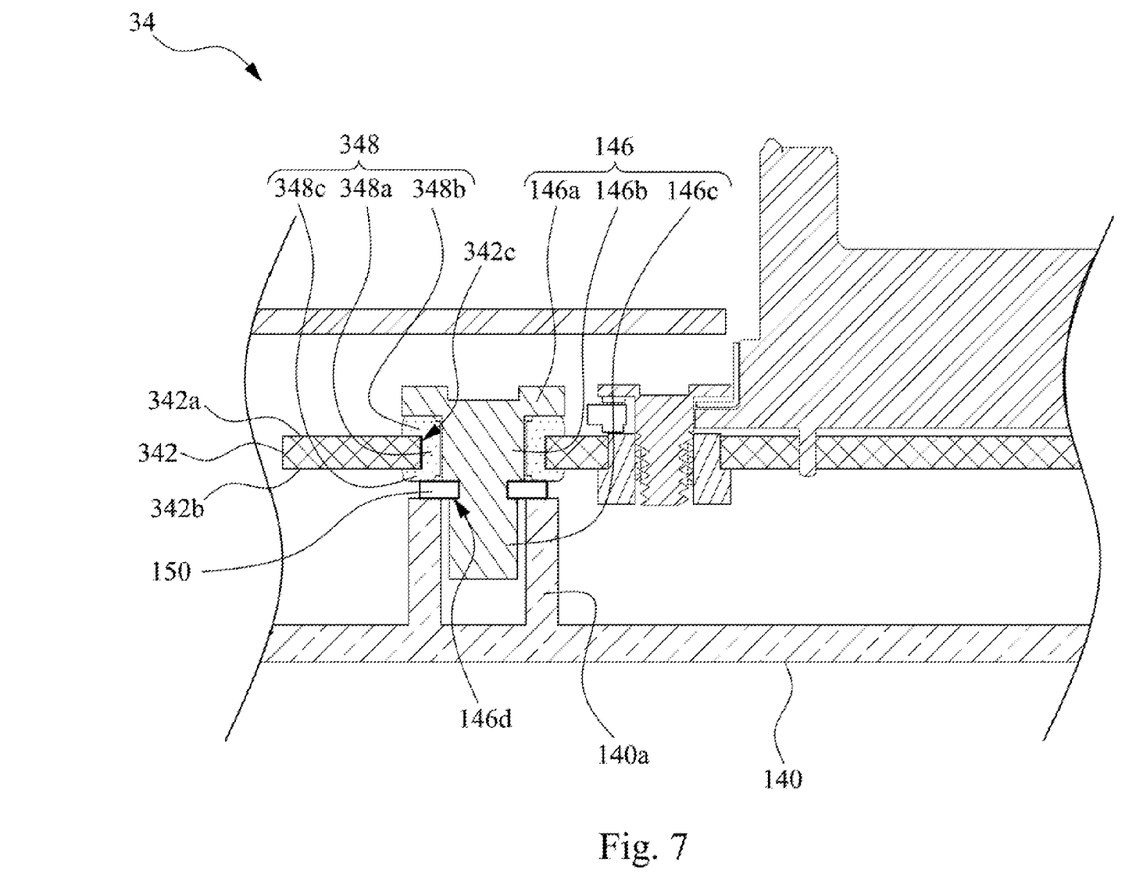
FIG. 7 is a partial cross-sectional view of the docking station in FIG. 6.

FIG. 6 is a partial exploded view of a docking station 34 according to another embodiment of the disclosure. FIG. 7 is a partial cross-sectional view of the docking station 34 in FIG. 6.

As shown in FIG. 6 and FIG. 7, the docking station 34 includes the housing 140, a circuit board 342, the base end electrical connector 144, the screw 146, a resilient member, and the stopper 150. The housing 140, the base end electrical connector 144, the screw 146, and the stopper 150 are the same as those in the embodiment in FIG. 4, so the structures, the functions, and the connection relationships among them can be referred to the foregoing related descriptions and are not repeated again.

It should be pointed out that the differences between the docking station 34 of the present embodiment and the docking station 14 in FIG. 4 are that the resilient member of the present embodiment is a sleeve 348, and a through hole 342c of the circuit board 342 has a side opening 342c1. The side opening 342c1 is located at a side of the circuit board 342, and a width of the side opening 342c1 is smaller than a diameter of the through hole 342c (i.e., the side opening 342c1 is necking relative to the through hole 342). Therefore, the sleeve 348 of the docking station 34 can be assembled to the through hole 342c via the side opening 342c1 of the circuit board 342 by deformed. Two ends of the sleeve 348 pass through the through hole 342c and are clamped between the head portion 146a of the screw 146 and the stud 140a of the housing 140.

Furthermore, the sleeve 348 of the docking station 34 includes a main body 348a, a first extending portion 348b, and a second extending portion 348c. The main body 348a of the sleeve 348 passes through the through hole 342c of the circuit board 342, and is clamped between the head portion 146a of the screw 146 and the stud 140a of the housing 140. The first extending portion 348b and the second extending portion 348c of the sleeve 348 are respectively connected to two ends of the main body 348a. The first extending portion 348b of the sleeve 348 is clamped between the head portion 146a of the screw 146 and the first surface 342a of the circuit board 342. The second extending portion 348c of the sleeve 348 is clamped between the second surface 342b of the circuit board 342 and the stud 140a of the housing 140. That is, the circuit board 342 is engaged between the first extending portion 348b and the second extending portion 348c of the sleeve 348. Therefore, the docking station 34 of the embodiment can diminish the unnecessary stresses generated between the tablet end electrical connector 102 and the base end electrical connector 144 by using the sleeve 348 during connection.

In addition, the sleeve 348 and the circuit board 342 of the docking station 34 are retained between the head portion 146a of the screw 146 and the stopper 150. Hence, when the circuit board 342 is fastened to the stud 140a of the housing 140, the stopper 150 can be used to fix the screw 146 and the sleeve 348 to the circuit board 342 first, so as to achieve the effect of conveniently assembling.

Figure 8A:
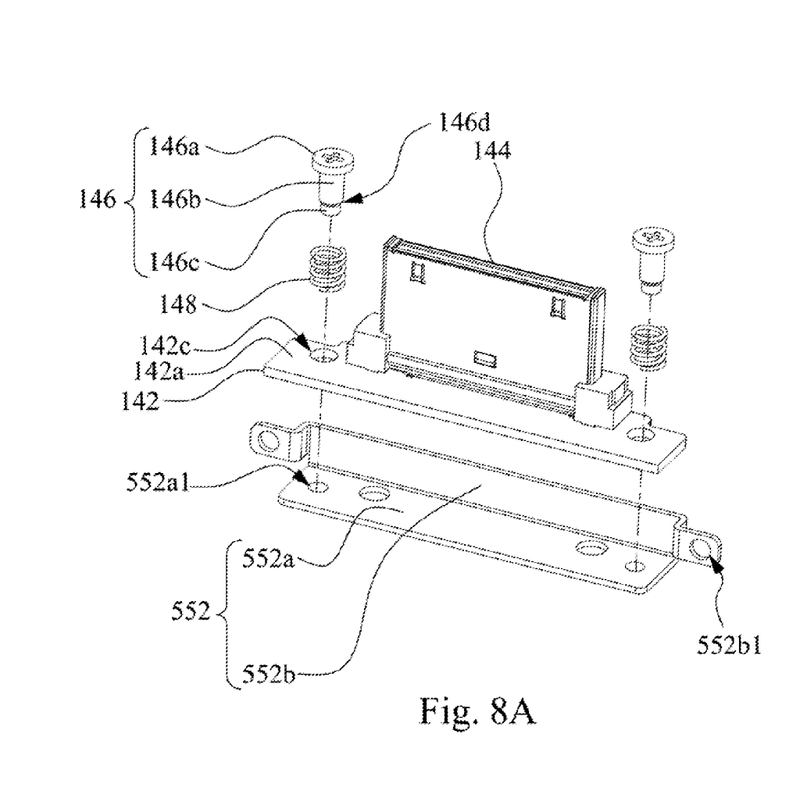
FIG. 8A is a partial exploded view of a docking station according to another embodiment of the disclosure.
Figure 8B:
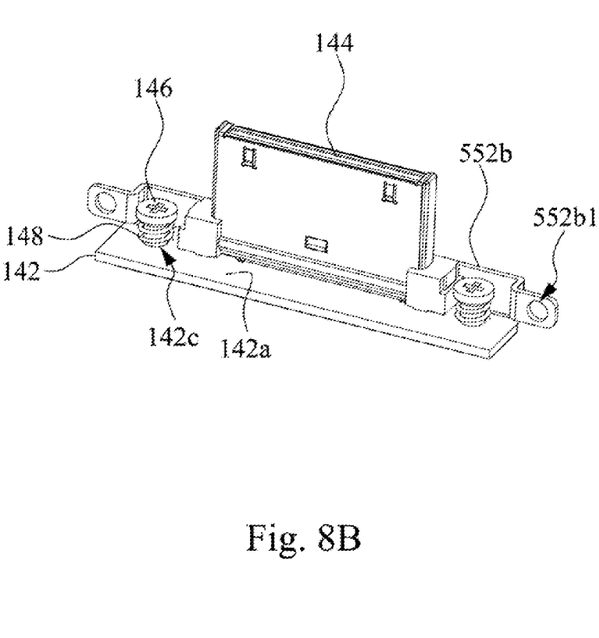
FIG. 8B is an assembly drawing of FIG. 8A.

FIG. 8A is a partial exploded view of a docking station according to another embodiment of the disclosure. FIG. 8B is an assembly drawing of FIG. 8A.

It should be pointed out that the stud 140a of the housing 140 shown in FIG. 4 is in vertical orientation, and the screw 146 vertically passes through the circuit board 142 and is fastened into the stud 140a. However, the stud (not shown) of the present embodiment is in horizontal orientation, so the circuit board 142 may be unable to be fastened to the stud because of structural interferences. Even though the screw 146 can be used to fasten the circuit board to the stud in horizontal orientation, the inserted direction of the base end electrical connector 144 would not allow the base end electrical connector 144 to be connected by the tablet end electrical connector 102 of the tablet module 10.

Therefore, as shown in FIG. 8A and FIG. 8B, the circuit board 142 can be fixed to the stud in horizontal orientation with the assistance of an additional bracket 552. The bracket 552 includes a first supporting portion 552a and a second supporting portion 552b. The first supporting portion 552a and a second supporting portion 552b are connected to each other, and are bended to be perpendicular to each other. The first supporting portion 552a has a first fastening hole 552a1, and the second supporting portion 552b has a second fastening hole 552b1. Hence, by fastening the screw 146 into the first fastening hole 552a1 of the first supporting portion 552a through the through hole 142c of the circuit board 142 and fastening a fastening member (not shown) into the stud in horizontal orientation through the second fastening hole 552b1 of the second supporting portion 552b, the circuit board 142 can be fixed to the stud. At the same time, the inserted direction of the base end electrical connector 144 allows the base end electrical connector 144 to be connected by the tablet end electrical connector 102 of the tablet module 10.

According to the foregoing recitations of the embodiments of the disclosure, it can be seen that the docking station of the disclosure sleeves the resilient member onto the screw for fastening the circuit board to the housing, so as to change the connection having no freedom of movement between the circuit board and the housing into a connection having freedom of movement. Therefore during the connection of the tablet end electrical connector of the tablet module and the base end electrical connector of the docking station, even if the tablet end electrical connector is not precisely aligned, the base end electrical connector having freedom of movement can move with the guidance of guiding structures of the connectors and complete the connection. The docking station of the disclosure not only solves the problems caused by the conventional hard connection, but also diminishes the unnecessary stresses generated between the tablet end electrical connector and the base end electrical connector.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fail within the scope of the following claims.

What is claimed is:

1. A docking station, comprising:
   a housing having a stud;
   a circuit board supported on the stud and having a through hole, wherein the through hole is aligned with and communicated with the stud;
   a base end electrical connector disposed on the circuit board, wherein the base end electrical connector and the stud are respectively located at two opposite sides of the circuit board;
   a screw fastened to the stud via the through hole, wherein the screw comprises:
      a head portion;
      a fastening portion;
      a passing portion connected between the head portion and fastening portion, wherein the screw further has an engaging trough located between the passing portion and the fastening portion;
   a resilient member sleeved onto the screw and located between the screw and the stud; and
   a stopper engaged with the engaging trough, wherein the resilient member and the circuit board are retained between the head portion and the stopper.

2. The docking station of claim 1, wherein the circuit board has a first surface and a second surface opposite to each other, the through hole runs through the first surface and the second surface, the head portion is located on the first surface, the passing portion passes through the through hole, the resilient member is sleeved onto the passing portion, and the fastening portion protrudes out from the second surface and is fastened to the stud.

3. The docking station of claim 2, wherein the resilient member is a compression spring, and the compression spring is compressed between the head portion and the first surface.

4. The docking station of claim 2, wherein the resilient member is compression spring, and the compression spring is compressed between the second surface and the stud.

5. The docking station of claim 2, wherein the resilient member is a sleeve, and the sleeve passes through the through hole and is clamped between the head portion and the stud.

6. The docking station of claim 5, wherein the sleeve comprises a main body, a first extending portion, and a second extending portion, the main body passes through the through hole and is clamped between the head portion and the stud, the first extending portion and the second extending portion are respectively connected to two ends of the main body, the first extending portion is clamped between the head portion and the first surface, the second extending portion is clamped between the second surface and the stud, and the circuit board is engaged between the first extending portion and the second extending portion.

7. The docking station of claim 6, wherein the screw further has an engaging trough located between the passing portion and the fastening portion, the docking station further comprises a stopper engaged with the engaging trough, and the sleeve and the circuit board are retained between the head portion and the stopper.

8. The docking station of claim 7, wherein the stopper is an E-type buckle.

9. The docking station of claim 1, wherein the stopper is an E-type buckle.

10. An electronic apparatus, comprising:
    a tablet module having a guiding hole and comprising a tablet end electrical connector, wherein the guiding hole and the tablet end electrical connector are located at the same side of the tablet module; and
    a docking station comprising:
       a housing having a stud and a guiding column, wherein the guiding column is configured to insert into the guiding hole;
       a circuit board supported on the stud and having a through hole, wherein the through hole is aligned with and communicated with the stud;
       a base end electrical connector disposed on the circuit board, wherein the base end electrical connector and the stud are respectively located at two opposite sides of the circuit board, and when the guiding column entirely inserts into the guiding hole, the base end electrical connector is electrically connected to the tablet end electrical connector;
       a screw fastened to the stud via the through hole, wherein the screw comprises:
          a head portion;
          a fastening portion;
          a passing portion connected between the head portion and the fastening portion, wherein the screw further has an engaging trough located between the passing portion and the fastening portion;
       a resilient member sleeved onto the screw and located between the screw and the stud, and
       a stopper engaged with the engaging trough, wherein the resilient member and the circuit board are retained between the head portion and the stopper.

11. The electronic apparatus of claim 10, wherein the circuit board has a first surface and a second surface opposite to each other, the through hole runs through the first surface and the second surface, the head portion is located on the first surface, the passing portion passes through the through hole, the resilient member is sleeved onto the passing portion, and the fastening portion protrudes out from the second surface and is fastened to the stud.

12. The electronic apparatus of claim 11, wherein the resilient member is a compression spring, and the compression spring is compressed between the head portion and the first surface.

13. The electronic apparatus of claim 11, wherein the resilient member is compression spring, and the compression spring is compressed between the second surface and the stud.

14. The electronic apparatus of claim 11, wherein the resilient member is a sleeve, and the sleeve passes through the through hole and is clamped between the head portion and the stud.

15. The electronic apparatus of claim 14, wherein the sleeve comprises a main body, a first extending portion, and a second extending portion, the main body passes through the through hole and is clamped between the head portion and the stud, the first extending portion and the second extending portion are respectively connected to two ends of the main body, the first extending portion is clamped between the head portion and the first surface, the second extending portion is clamped between the second surface and the stud, and the circuit board is engaged between the first extending portion and the second extending portion.

16. The electronic apparatus of claim 15, wherein the screw further has an engaging trough located between the passing portion and the fastening portion, the docking station further comprises a stopper engaged with the engaging trough, and the sleeve and the circuit board are retained between the head portion and the stopper.

17. The electronic apparatus of claim 16, wherein the stopper is an E-type buckle.

18. The electronic apparatus of claim 10, wherein the stopper is an E-type buckle.

* * * * *